United States Patent [19]

Flynn

[11] Patent Number: 5,399,878
[45] Date of Patent: Mar. 21, 1995

[54] SHUTTERED CASSETTE SLOT FOR A READER

[75] Inventor: Michael R. Flynn, Rochester, N.Y.

[73] Assignee: Eastman Kodak Company, Rochester, N.Y.

[21] Appl. No.: 216,899

[22] Filed: Mar. 23, 1994

[51] Int. Cl.⁶ ............................................. G01N 23/04
[52] U.S. Cl. ...................................... 250/589; 378/172
[58] Field of Search ................. 250/589; 378/174, 188, 378/172; 414/411

[56] References Cited

U.S. PATENT DOCUMENTS 4,363,548  12/1982  Oberhoffner et al. ............... 354/310
5,124,550   6/1992  Boutet et al. .
5,186,338   2/1993  Boutet ................................. 211/41
5,308,994   5/1994  Ohta et al. .......................... 250/589

Primary Examiner—Carolyn E. Fields
Attorney, Agent, or Firm—Dana M. Schmidt

[57] ABSTRACT

Apparatus for receiving and reading a cassette of light-sensitive material, wherein the cassette is a) of varying width and b) free of a pallet used to fit a standard maximum width slot. To prevent light-leaks created when a cassette of a width less than the maximum is used, shutters equal to one less than the number of cassette widths to be used, are hinged to one of the upper and lower jaws used to clamp the cassette in the light-tight chamber of the reading apparatus.

7 Claims, 4 Drawing Sheets

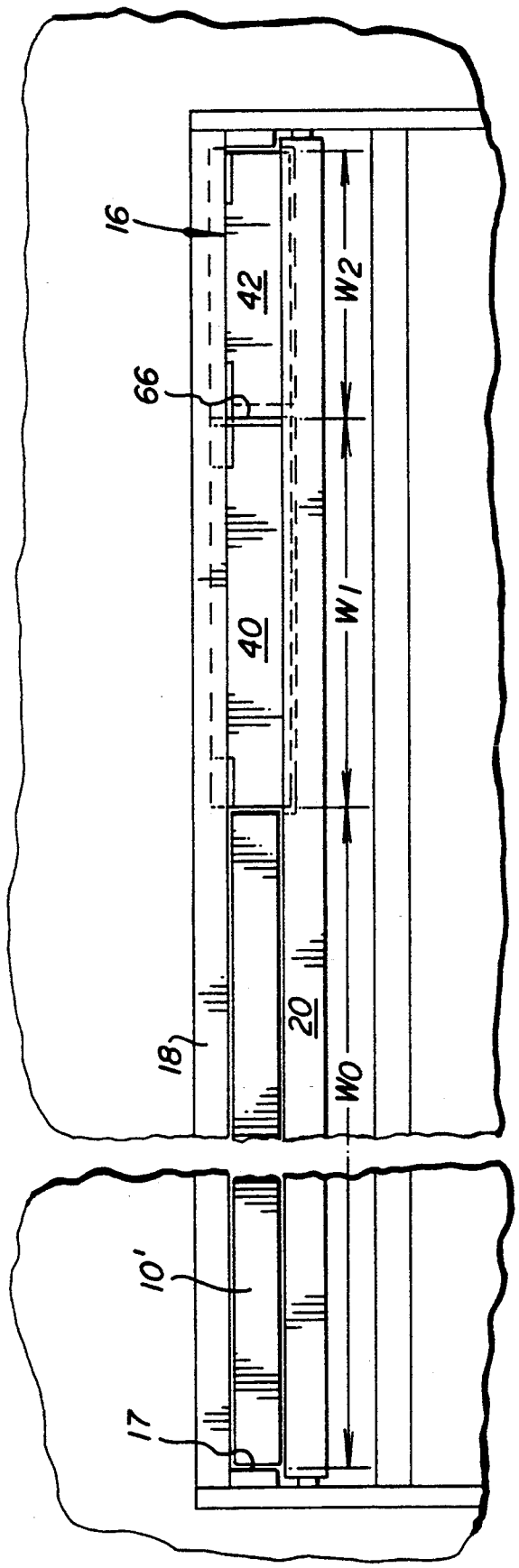
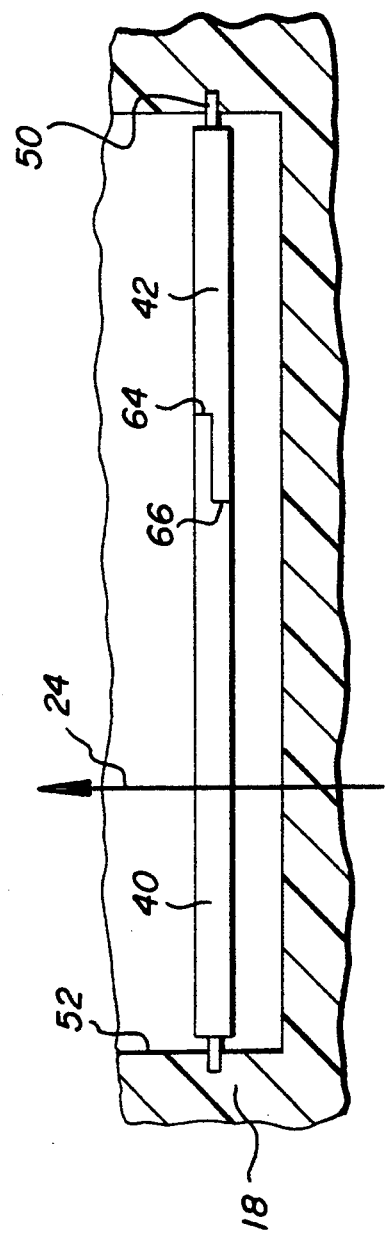
Fig. 4
Fig. 7

– 5,399,878 –

SHUTTERED CASSETTE SLOT FOR A READER

FIELD OF THE INVENTION

This invention relates to apparatus for processing, such as by reading, light-sensitive members taken from a cassette free of a pallet, where the cassette can have varying widths.

BACKGROUND OF THE INVENTION

It is known in the field of computed radiography that phosphor sheets are supplied via cassettes from which they are pulled and their latent image is scanned in a reader. (See, for example, U.S. Pat. Nos. 5,124,550 and 5,186,338). It is critical, when the cassettes and sheets are fed to the reader that the sheet "not be exposed to undesirable light" so as "to prevent image degradation" (column 1 of the '550 patent). Hence, shielding is provided around the cassette as it is clamped in the reader. Because most readers come with a single-sized opening and appropriate shields therefor, but cassettes come in multiple sizes, it is also common to mount the variously-sized cassettes on a single-sized pallet for insertion into the reader, as per U.S. Pat. No. 5,186,338.

Although such pallets work well, they do have a drawback: They provide an additional expense and handling requirement. It would be advantageous, instead, to be able to feed the variously-sized cassettes directly into the reader. However, this has been difficult, if not impossible, as the width of the reader slot not occupied by a smaller cassette creates a light-leak.

U.S. Pat. No. 4,363,548 does describe one attempt to overcome this problem. To allow two smaller size cassettes to be used (without a pallet), a removable insert is used in the reader slot having two separate smaller slots each of which is shuttered. Only the slot actually occupied by its appropriately sized cassette ends up opening a shutter, and since the cassette is the proper size, light-shielding is maintained. However, a solid frame member 30 separates the two slots and shutters, so that the insert must be removed when the large-size cassette is to be inserted.

Thus, prior to this invention there has been a problem in providing a reader for a phosphor screen from a cassette of varying size, without the use of a pallet or a removable insert which creates shuttered slots sized only for the smaller cassettes.

SUMMARY OF THE INVENTION

I have constructed a reader that overcomes these problems.

More specifically, there is provided apparatus for receiving cassettes containing light-sensitive members in a light-tight chamber, each cassette having one of a number of possible predetermined widths, the apparatus comprising:

upper and lower jaws for holding a cassette in place between the jaws, a single pair of spaced apart upright guides, the jaws being movably mounted between the guides and the guides defining between them a dimension equal to the maximum width of the cassettes receivable within the apparatus, a plurality of shutters hingedly mounted on one of the upper and lower jaws between the upright guides, and a slot for each of the shutters, mounted within the other of the upper and lower jaws and having the same length as, and a location opposite to, each shutter, the shutters being disposed so as to swing into the opposite slot to close the gap between the jaws in absence of a cassette, the shutters being free of a fixed divider between them so that a cassette of a width equal to the dimension of maximum width measured between the guides can be inserted between the jaws to force all of the shutters open.

Accordingly, it is an advantageous feature of the invention that a light-sensitive member can be pulled from a cassette of varying size in a reader having only a single, large slot for such cassettes of varying sizes, while maintaining a light-shielding.

It is a related advantageous feature that such cassettes can be used in such a reader without requiring a large pallet to fill the large-size slot, or an insert that files the slot and carries separately shuttered sub-slots to achieve light-shielding of the slot not used.

Other advantageous features will become apparent upon reference to the following Description of the Preferred Embodiments, when read in light of the attached drawings.

BRIEF DESCRIPTION OF THE DRAWINGS

FIG. 4 is an elevational view similar to that of FIG. 2, but without the bladder and pressure plate, and showing the smallest-width cassette clamped in place without pushing away one of the shutters;

FIG. 7 is a fragmentary plan view in section taken generally along the line VII—VII of FIG. 3.

DESCRIPTION OF THE PREFERRED EMBODIMENTS

The description which follows is directed to preferred embodiments using cassettes, a reader, and cassette sizes all of a particular type, to read a phosphor screen bearing a latent image, and using $(n-1)$ shutters where $n = 3$. In addition, the invention is useful regardless of the type or size of cassette, or type of reader, and regardless whether the light-sensitive member of the cassette is a phosphor screen or some other light-sensitive member, for example, a photographic film. The invention is also useful regardless of the integer value of n.

Thus, the invention preferably utilizes cassettes of phosphor screens for computed radiography, for example, those available under the tradename Kodak "Ektascan SP Cassette" from Eastman Kodak Company, and the reading apparatus is one available under the tradename Kodak "Ektascan Phosphor Reader 3110", also from Eastman Kodak Company.

Figure 1:
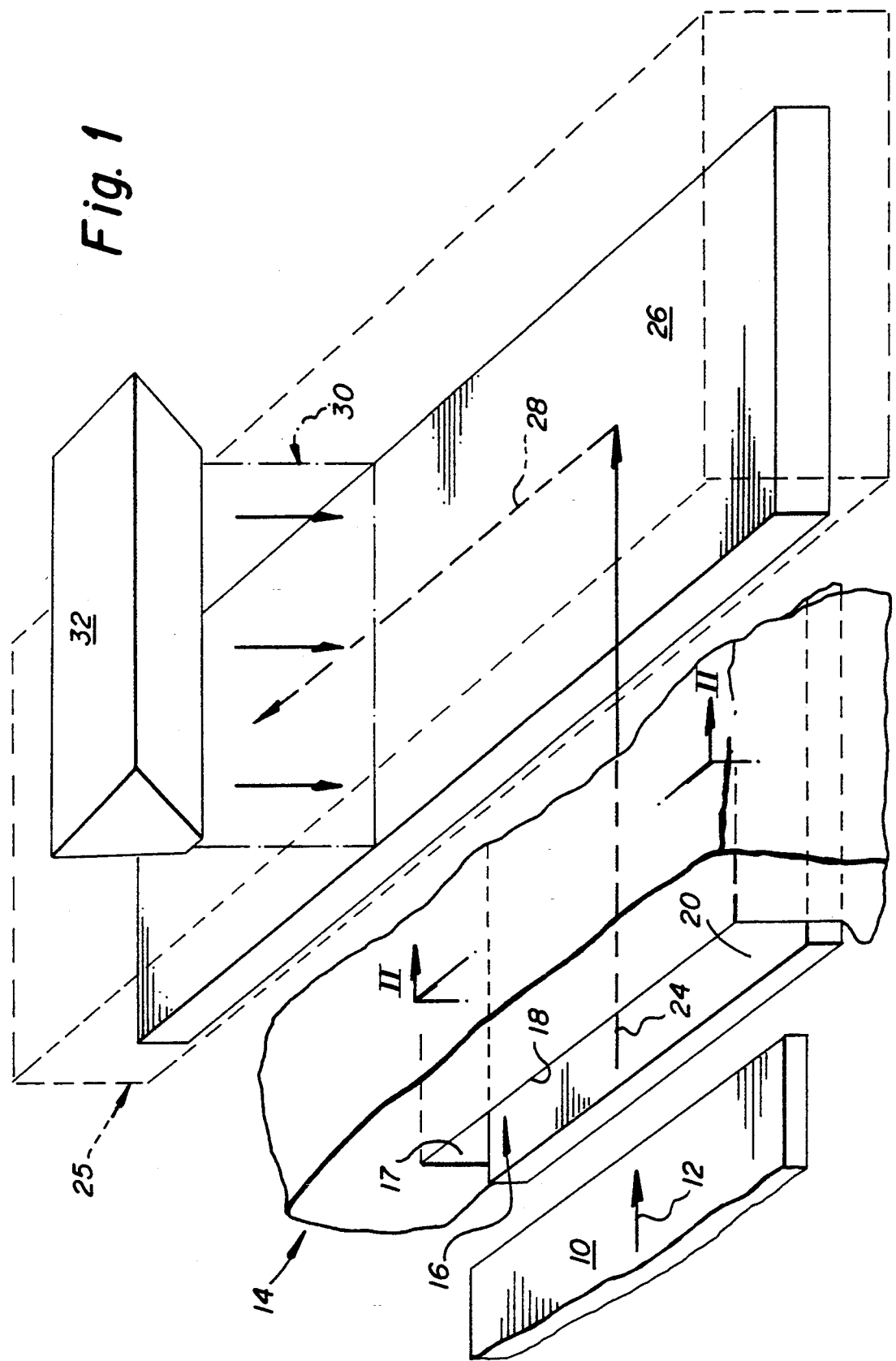
FIG. 1 is an isometric view, partially schematic, illustrating the overall reading apparatus in which the invention is to be provided, the shutters, however, not being shown.
Figure 2:
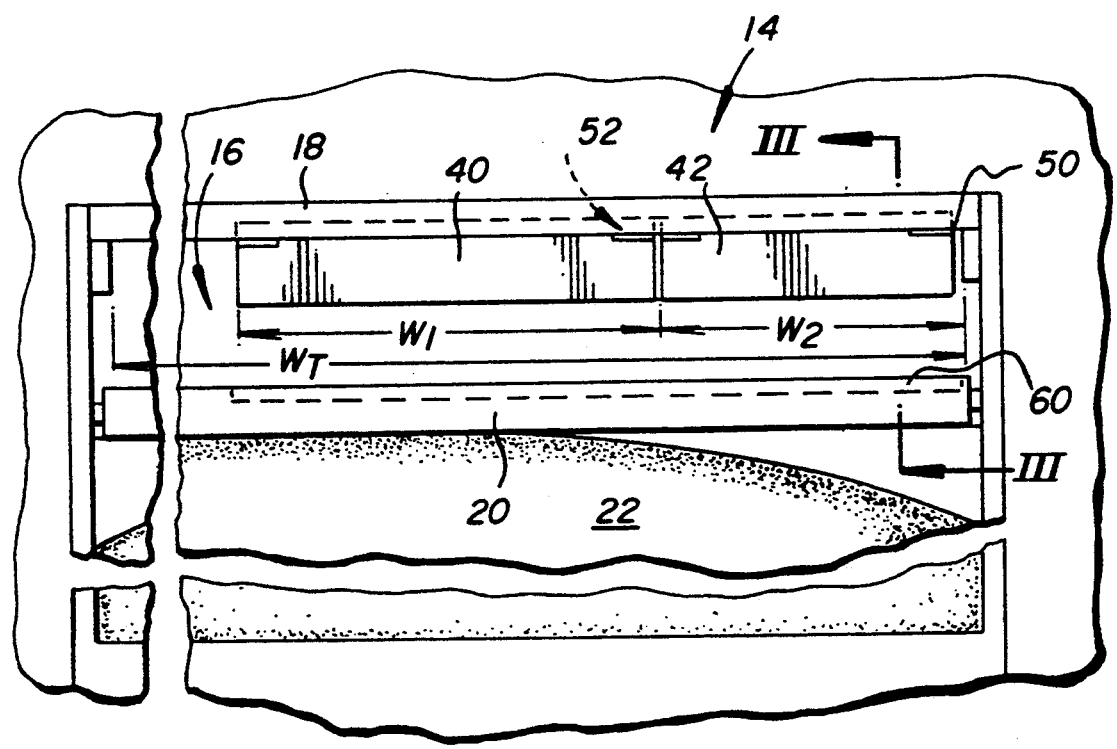
FIG. 2 is a fragmentary elevational view in section, generally along the line II—II of FIG. 1 and with the shutters of the invention in place.

Such cassettes 10, FIG. 1, are fed, arrow 12, into such a reading apparatus 14 having a slot 16 formed by a generally fixed upper jaw 18 and fixed left side 17, a movable lower jaw 20, jaw 20 being actuated by a conventional bladder mechanism 22, FIG. 2, to move jaw 20 upward. Once the cassette is clamped between jaws 18 and 20, a phosphor screen is withdrawn therefrom, arrow 24, FIG. 1, and pulled into a light-tight chamber 25 (in phantom) onto a table 26, whence it is then pushed, arrow 28, past a scanner beam 30 from reader 32. All of the aforesaid is conventional. Hence, further description is unnecessary, except to say that light-leakage into chamber 25, such as via slot 16, is to be avoided.

Figure 3:
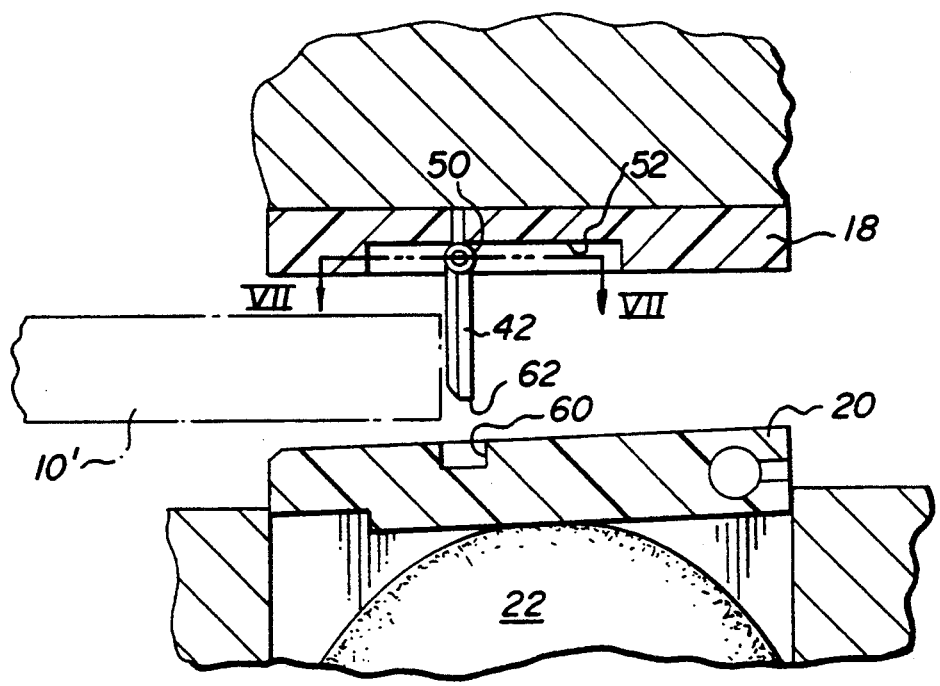
FIG. 3 is a fragmentary elevational view in section, taken along the line III—III of FIG. 2.

In accordance with the invention, the avoidance of light-leakage through the slot, even when using cassettes of varying widths, is achieved by, FIGS. 2 and 3, the use of shutters 40,42, dimensioned with width $W_1 + W_2$ to fill in the portion(s) of the total width $W_T$ of slot 16 that is not occupied when a cassette of a width smaller than $W_T$ is used.

More precisely, FIG. 3, each shutter, such as shutter 42, is hingedly mounted to either the upper or lower jaw, here the upper jaw 18, at hinge 50. Most preferably, hinge 50 is disposed within a sufficiently deep recess 52 of jaw 18 for maximum light-shielding, so that the shutter will pivot downwardly under the influence of gravity, and upwardly completely into recess 52, when pushed by a cassette. A similar hinge and recess 52 is provided for shutter 40, FIG. 2. To complete the light-shield, a mating slot 60 is preferably disposed in the jaw not mounting the shutter, opposite the shutter, to receive the shutter edge 62 when the jaws are clamped together and no cassette 10 is pushing against the shutter (FIG. 4).

To complete the light-shield, shutters 40 and 42 can have side edges 64 and 66, respectively, which abut precisely together. However, this requires precise mechanical tolerances. More preferably, they are constructed, FIG. 7, so that edge 64 of shutter 40 overlaps edge 66 of shutter 42, behind shutter 42, that is, downstream of the advance, arrow 24, of a cassette within the slot. In this fashion, shutter 40 and edge 64 can freely swing in the direction of arrow 24, when a cassette having width $W_0 + W_1$ (not shown) is inserted into slot 16 shown in FIG. 4, and still seal against shutter 42 when such a cassette is removed, without carefully controlling the abutment of edges 64 and 66 if they were non-overlapping (not shown).

Figure 5:
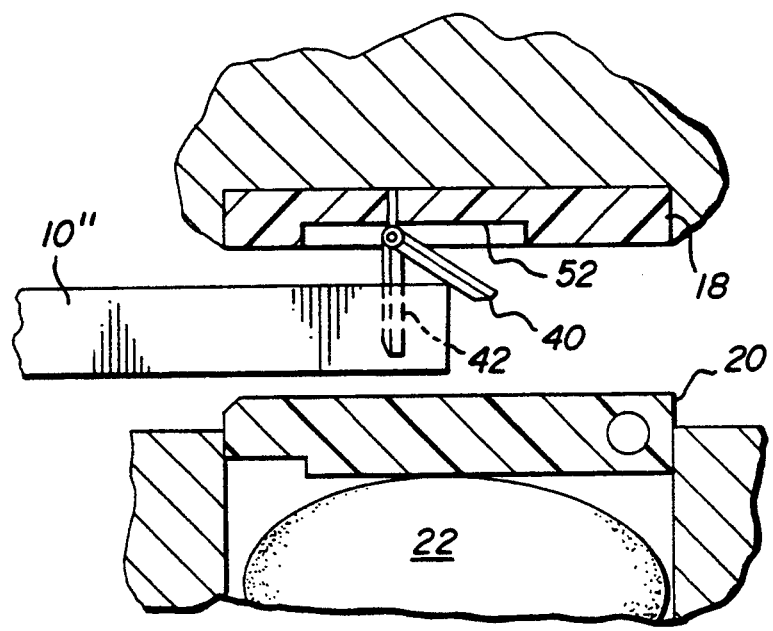
FIG. 5 is an elevational view similar to that of FIG. 3, but illustrating a cassette larger than the one of FIG. 4 and sufficiently large to push away one, and only one, of the shutters.

As used, then, the smallest width cassette 10', FIG. 4, is inserted to the left of the shutters 40 and 42, with a width $W_0$ that fits the cassette snug up against shutter 40, and shutter 42, which remain down to close off light-leaks. However, when a cassette 10" of a width=$W_0 + W_1$ is inserted, also against left side 17 of slot 18, FIG. 1, the cassette causes only shutter 40 to pivot, FIG. 5, leaving shutter 42 down in place to close off light-leaks.

Finally, not shown, when a cassette of a width $W_T$ is inserted, obviously both shutters 40 and 42 pivot upwardly out of the way.

Figure 6:
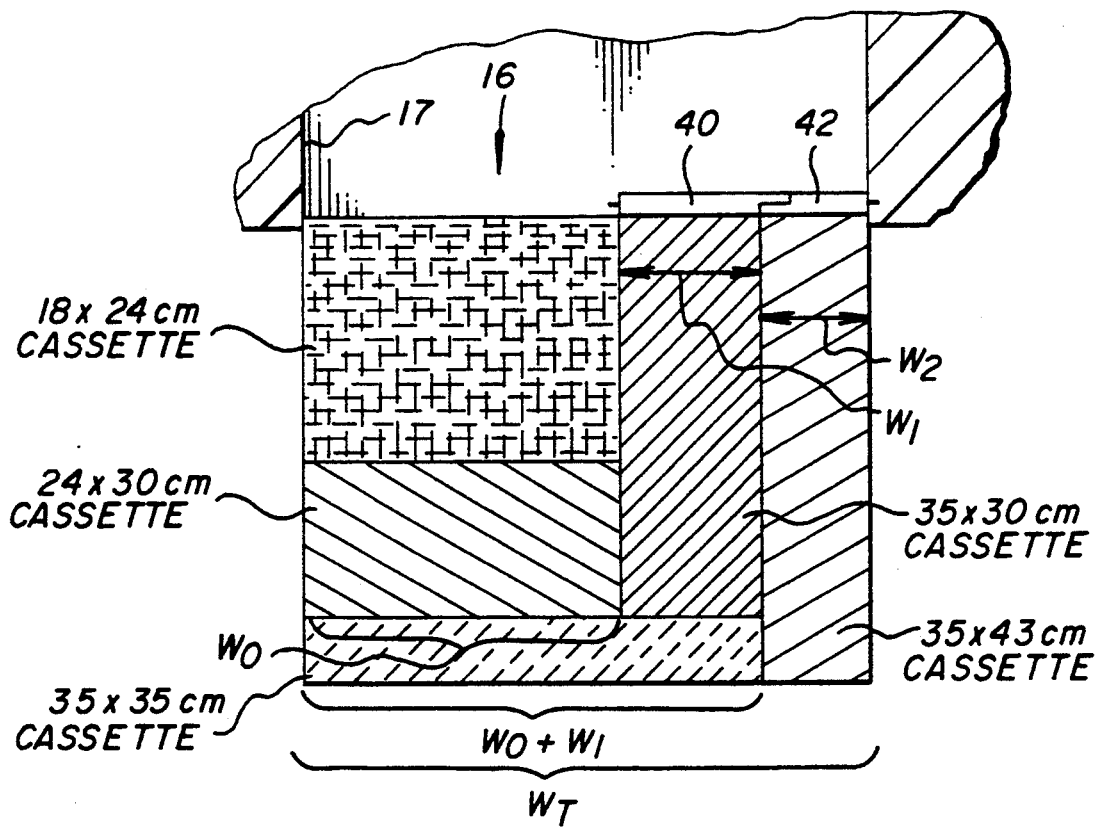
FIG. 6 is a schematic illustration of how the provision of two shutters allows for the use of cassettes having three widths of which the overall number of usable cassettes equals, e.g., 5.

The variety of cassettes that can be handled by this reading apparatus is shown in FIG. 6. Only three widths are used, that is, width $W_0$ (the smallest), $W_0 + W_1$, and $W_T = W_0 + W_1 + W_2$. However, this will accommodate five types of cassettes, e.g., 18 ×24 cm, 24×30 cm, 30×35 cm, 35×35 cm, and 35×43 cm. In those five instances, $W_0 = 24$ cm, $W_0 + W_1 = 35$ cm, and $W_T = 43$ cm.

Alternatively (not shown), the shutters can be hinged into lower jaw 20 rather than upper jaw 18, using a torsion spring or the like that normally biases them upward to close off light-leaks. Incoming cassettes simply push the shutter(s) down against the action of the spring.

Also, not shown, the invention of this reading apparatus can be used at the exit end of an autoloader of the type described in U.S. Pat. No. 5,246,326.

The invention disclosed herein may be practiced in the absence of any element which is not specifically disclosed herein.

The invention has been described in detail with particular reference to preferred embodiments thereof, but it will be understood that variations and modifications can be effected within the spirit and scope of the invention.

What is claimed is:

1. Apparatus for receiving cassettes containing light-sensitive members in a light-tight chamber, each of said cassettes having one of a number of possible predetermined widths, the apparatus comprising:
   upper and lower jaws for holding a cassette in place between the jaws,
   a single pair of upright guides spaced apart a distance sufficiently equal to the width of the largest-width cassette so as to provide some light-shielding when one of said largest cassettes is in said chamber, said jaws being movably mounted between said guides and said guides defining between them a dimension equal to the maximum width of said cassettes receivable within the apparatus,
   a plurality of shutters hingedly mounted on one of said upper and lower jaws between said upright guides, and
   a slot for each of said shutters, mounted within the other of said upper and lower jaws and having the same length as, and a location opposite to, said each shutter,
   said shutters being disposed so as to swing into said opposite slot to close the gap between said jaws in the absence of a cassette,
   said shutters being free of a fixed divider between them so that a cassette of a width equal to said dimension of maximum width measured between said guides can be inserted between said jaws to force all of said shutters open.

2. Apparatus as defined in claim 1, wherein said cassettes have one of n possible widths, and wherein said shutters are equal to (n−1) in number, where n is an integer.

3. Apparatus as defined in claim 2, wherein n is equal to 3.

4. Apparatus as defined in claim 1 or 2, wherein one of said shutters overlaps the other when both are generally vertical, to prevent light from penetrating between them.

5. Apparatus as defined in claim 1 or 2, wherein said shutters are hingedly mounted within said upper jaw and said slots are within said lower jaw.

6. Apparatus as defined in claim 1 or 2, wherein said members are phosphor screens, and further including with said apparatus, a reader for scanning and detecting latent images in said screens.

7. Apparatus as defined in claim 1 or 2, wherein said cassettes are free of a pallet.

* * * * *